Patented June 2, 1925.

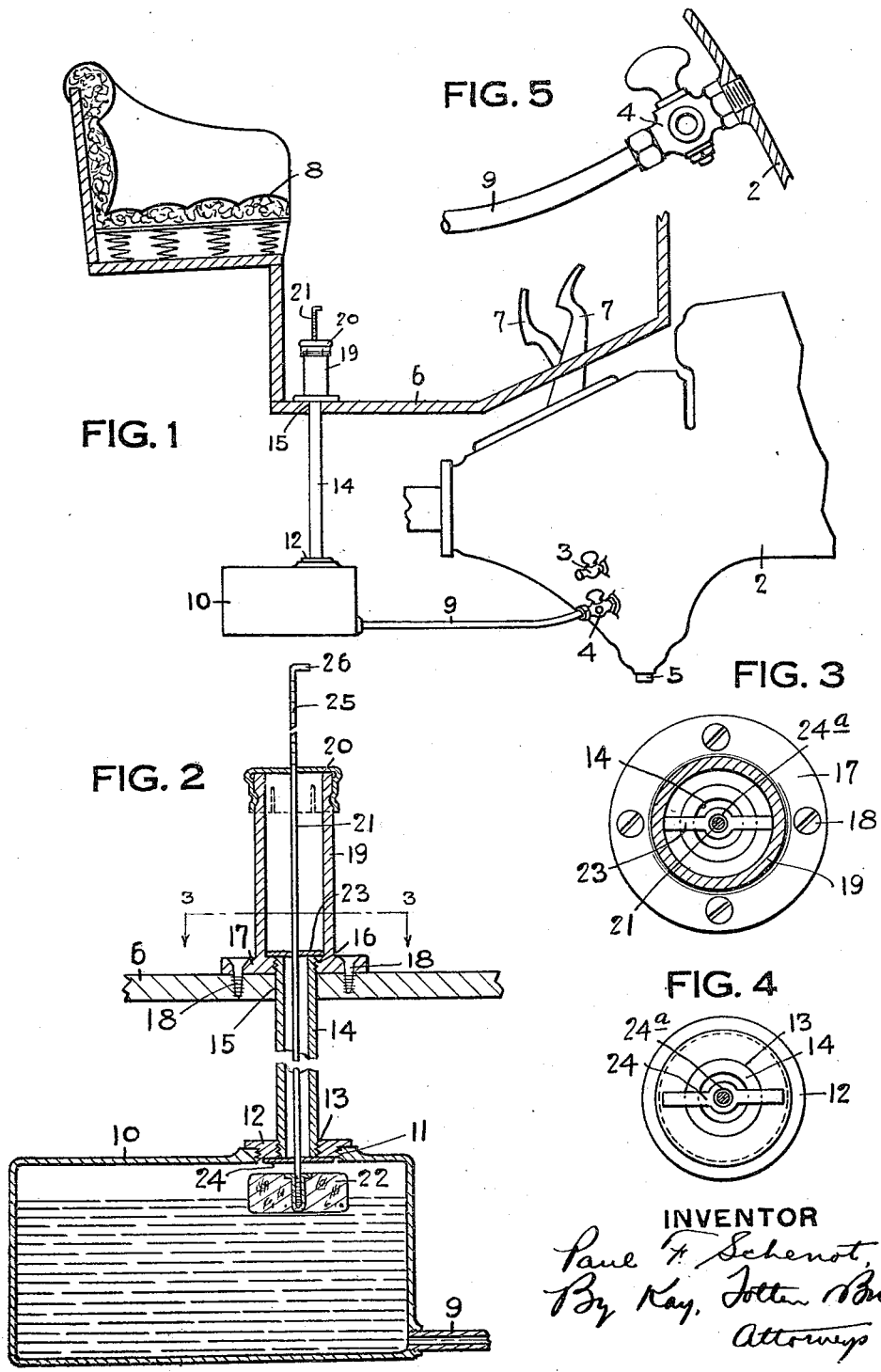

1,539,960

UNITED STATES PATENT OFFICE.

PAUL F. SCHENOT, OF CASTLE SHANNON, PENNSYLVANIA.

LUBRICATING DEVICE FOR AUTOMOBILES.

Application filed October 12, 1922. Serial No. 594,089.

*To all whom it may concern:*

Be it known that I, PAUL F. SCHENOT, a citizen of the United States, and resident of Castle Shannon, in the county of Allegheny and State of Pennsylvania, have invented a new and useful Improvement in Lubricating Devices for Automobiles; and I do hereby declare the following to be a full, clear, and exact description thereof.

My invention relates to apparatus for supplying lubricating oil to automobile engines, and is particularly designed for the engines of Ford automobiles, although my invention may also be employed with advantage on other types of automobile engines, particularly those employing the splash system of lubrication.

One object of my invention is to provide an improved device for supplying oil to an automobile engine, whereby the oil may be introduced while the engine is running and in a convenient manner.

Another object of my invention is to provide an oil-filling device which shall also include an indicator for showing the quantity of oil in the crank case of the engine.

A further object of my invention is to provide an oil-filling device for automobile engines which shall include a supply tank, and which shall thereby increase the length of time that the engine will run properly without replenishing the oil.

It is a matter of some inconvenience to pour motor oil into the crank case of a Ford engine, and when the driver desires to know how much oil remains in the crank case it is necessary to open one or more of the petcocks which is still more inconvenient.

According to my present invention I avoid both of these inconveniences by providing an oil-supply tank connected by means of a suitable pipe to one of the pet-cocks of the crank case, and also connected by means of a vertical pipe to a filling pipe or funnel located upon the floor of the car near the driver's seat. Oil may be conveniently poured through the filler pipe at any time, whether the engine is running or not. The vertical pipe through which oil is poured into the supply tank is also employed as a gauge to indicate the quantity of oil in the system. For this purpose a rod extends through the vertical pipe and is provided with a float which causes the upper end of the rod to protrude from the filling pipe to an amount corresponding to the level of oil in the supply tank. Since the oil in the supply tank is always at the same level as the oil in the crank case, the indicator rod shows at all times the level of oil in the crank case.

In the accompanying drawing Fig. 1 is a side view, partly in elevation and partly in section, of a portion of a Ford automobile having my invention applied thereto; Fig. 2 is an enlarged vertical sectional view taken through the supply tank and filling pipe; Fig. 3 is a horizontal sectional view taken on the line 3—3, Fig. 2; and Fig. 4 is an inverted plan view of the supply tank cap.

In the drawing the numeral 2 indicates the rear portion of the crank case of a Ford automobile engine having the usual petcocks 3 and 4 and the drain cock 5. The floor boards of the automobile are indicated at 6, the pedals at 7 and the seat at 8.

The lower petcock 4 may be of the ordinary type found on Ford engines, or may, as shown, be a three-way cock for convenient attachment to an oil pipe 9 which connects the pet cock 4 and the lower portion of an oil-supply tank 10. The pipe 9 may suitably consist of ⅜-inch copper tubing.

The supply tank 10 is provided with an internally threaded seat 11 in which is screwed a cap 12 provided with a screw threaded opening 13 which receives the screw-threaded end of a vertical pipe 14. The cap 12 is employed in order to give access to the interior of the tank 10 for cleaning or adjustment. The cap 12 may, for example, be 1½ inches in diameter, and the vertical pipe 14 may be ¾ inch in diameter. The tank 10 may be about 9 inches long, 4 inches deep and 3 inches wide, in which case it holds approximately 1 quart of oil. My invention is of course not limited to these dimensions, which are stated for illustration only.

The upper end of the vertical pipe 14 extends through an opening 15 in one of the floor boards, this opening being as near to the seat 8 as is convenient. The upper end of the pipe 14 is screw-threaded, as shown at 16, for attachment to an internally threaded flange 17 which is attached to the floor board 6 by means of screws 18 or otherwise and carries a filler pipe 19. This filler pipe may suitably consist of a short length of 1½ inch pipe, the lower end of which is brazed or otherwise secured to the upper surface of the flange 17. The upper end of the filler pipe 19 is closed by means of a cap 20 which may snap over the end of the pipe 19 or may be held in place by any other desired means.

A vertical rod 21 extends through the vertical pipes 14 and 19 and carries at its lower end a float which, as shown, is a block of cork 22. Upper and lower guides 23 and 24 are provided for the rod 21 and, as shown, each of these guides consists of a short strip of metal extending diametrically across the upper and lower ends of the pipe 14 and each having an opening 24 through which the rod 21 slides loosely. The guide strips 23 and 24 may suitably be secured to the upper and lower surfaces, respectively, of the flange 17 and the tank cap 12.

The rod 21 is of such length that when the tank 10 is filled with oil the rod protrudes above the cap 20 a distance substantially equal to the depth of the tank 10, so that when the upper end of the rod 21 sinks to the level of the cap 20 this indicates that the tank 10 is empty. The upper end of the rod 21 may, if desired, be provided with graduations, as shown at 25, to indicate the quantity of oil in the tank 10, and a projection 26 may be formed at the top of the rod 21 to prevent the upper end of the rod from being forced below the cap 20.

The upper surface of the tank 10 is preferably at, or slightly above, the level of the upper petcock 3, so that when the tank 10 is completely filled with oil the oil in the crank case stands at the level of this petcock. Oil may be introduced into the engine at any time by merely removing the cap 20 and pouring the oil into the upper end of the filler pipe 19. On account of the reserve supply of oil provided in the oil tank 10, this addition of oil need only be made at comparatively long intervals. The rod 21 indicates at all times the level of the oil in the system, and this level may be ascertained at any time, either by looking at the device, or by touch.

Various changes in the construction and arrangement of parts may be made without departing from my invention, the scope of which is indicated in the appended claims.

I claim as my invention:

1. Lubricating apparatus for automobile engines comprising an oil-supply tank, means for connecting said tank to the crank case of the automobile engine, a vertical pipe for introducing oil into the said tank, the upper end of the said vertical pipe being disposed adjacent to the driver's seat, a filler pipe of larger diameter than the said vertical pipe and secured to the upper end of said vertical pipe, and a cap for closing the upper end of said filler pipe.

2. Lubricating apparatus for automobile engines comprising an oil supply tank, a pipe connecting said supply tank to the crank case of the automobile engine, a vertical pipe for introducing oil into said tank, a filler pipe of larger diameter than said vertical pipe and connected to the upper end of said vertical pipe, a cap for closing the upper end of said filler pipe, a rod extending through said vertical pipe and said filler pipe and protruding through an opening in said cap, a float carried by the lower end of said rod, and a guide for controlling the vertical movement of said rod.

3. Apparatus for supplying oil to Ford automobile engines comprising an oil-supply tank, a pipe connecting the lower portion of said tank to the lower petcock of the engine crank case, a cap applied to an opening in the upper side of said tank, a vertical pipe of smaller diameter than the said opening having its lower end secured to said cap and having its upper end extending through an opening in one of the floor boards of the automobile, a filling device secured to the upper end of said vertical pipe and consisting of a flange resting upon said floor board, and a vertical length of pipe secured to said flange and of larger diameter than the said first-named vertical pipe, a cap for closing the upper end of said filling device, a rod extending through said vertical pipes and protruding through an opening in said cap, a float carried by the lower end of said rod, and means for guiding the vertical movement of said rod.

4. Lubricating apparatus for automobile engines comprising an oil-supply tank, a pipe for connecting said supply tank to the crank case of the automobile engine, a vertically disposed filler pipe of relatively large diameter, a smaller pipe communicating therewith and serving as a conduit to the tank, a rod extending through the two last-named pipes, a float secured to the bottom of the rod, and means disposed within one of said last-named pipes for guiding said rod but permitting the passage of oil to said tank, the said filler pipe being supported upon the floor and serving through connections on said smaller pipe to support said tank.

In testimony whereof I the said PAUL F. SCHENOT have hereunto set my hand.

PAUL F. SCHENOT.